3,273,449
DISPLAY APPARATUS
Marvin J. Foral, Doylestown, Pa., assignor to the United States of America as represented by the Secretary of the Navy
Filed May 22, 1963, Ser. No. 282,520
6 Claims. (Cl. 88—24)

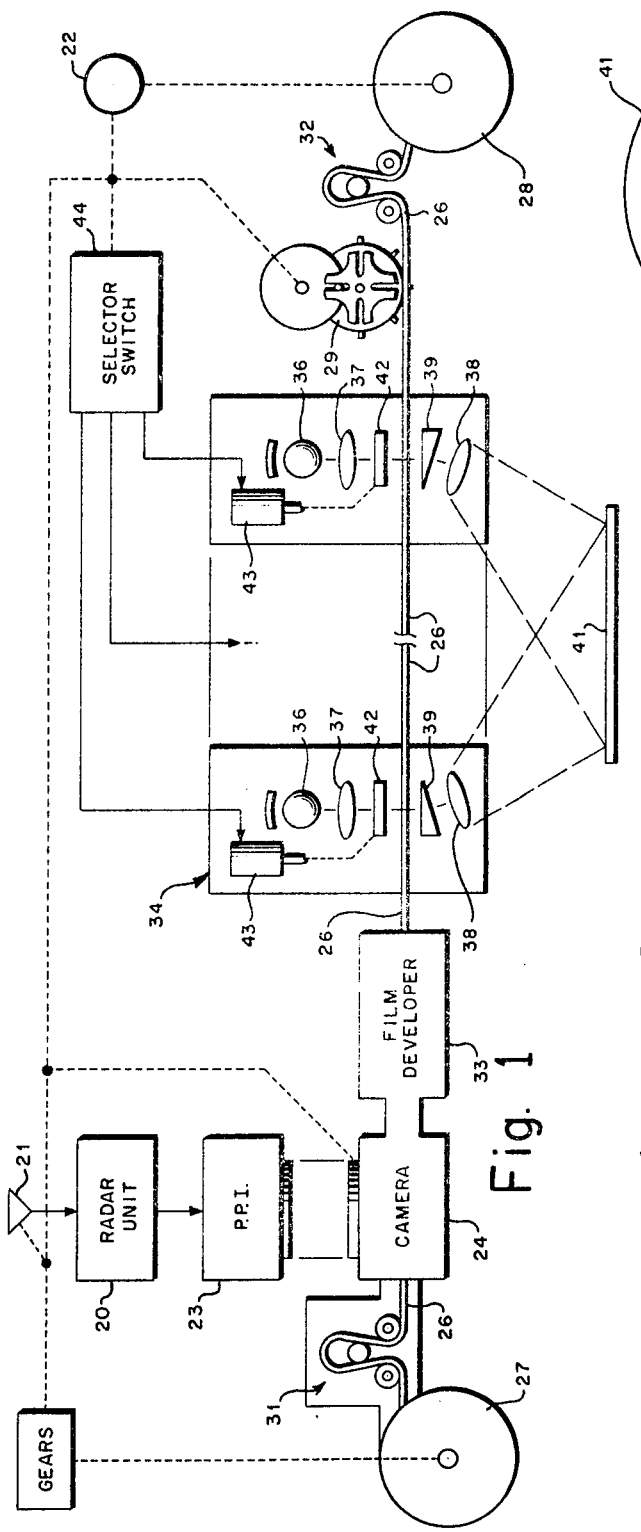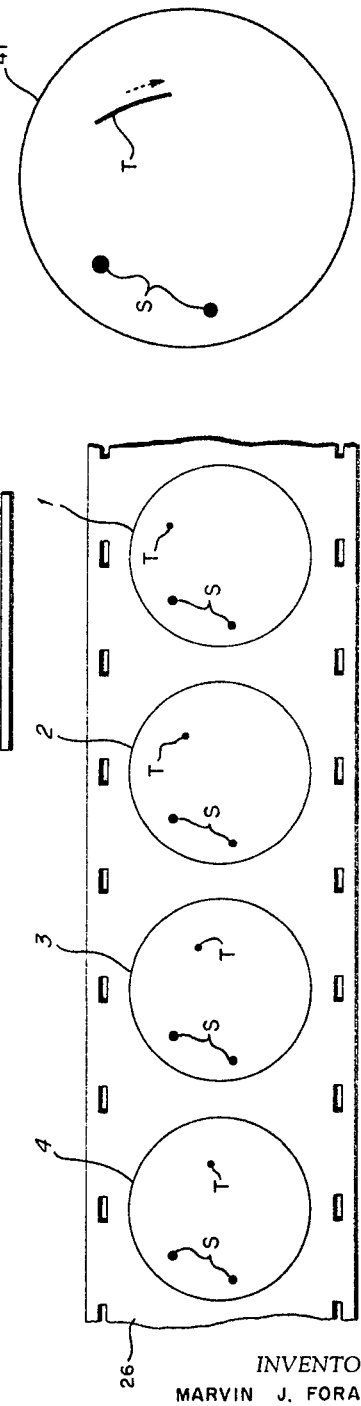

The invention described herein may be manufactured and used by or for the Government of the United States of America for governmental purposes without the payment of any royalties thereon or therefor.

The present invention relates to display apparatus and more particularly to a visual display apparatus for indicating the course and velocity of objects in space.

In military aircraft, target information is usually obtained by radar and displayed on a C.R.T.-type plan position indicator. Of course other reflected and/or otherwise returned wave systems may provide the target information such as sonar. The target positions are marked on the C.R.T. screen by the observer with a grease pencil at equal time intervals. The target marks, after several intervals, could then be analyzed by the observer to determine the relative velocity and course taken by the target over those intervals for predicting the future course and velocity of the target. The maximum number of targets one observer can efficiently monitor by this method is about five. Moreover, a target surrounded by a cluttered or "noisy" background would not be detected or would be lost due to the inability of the observer to ascertain which of the displayed matter is the target. These shortcomings of indistinguishable targets and limited number of targets monitored has been recognized as evidenced by the prior art. Numerous attempts have been devised to aid the operator in distinguishing large numbers of targets from cluttered backgrounds while also indicating the relative directions and velocities. In each attempt, however, the price paid has been added complexity, increased delay in information readout, and degradation of display quality such as dimmer images. In some prior art devices, the relative motions and directions of objects are almost imperceptible if they are slowly moving. These disadvantages obviously limit their usefulness.

Accordingly, it is an object of the present invention to provide a display instrument which clearly and perceptibly distinguishes detected objects moving relative to each other in space and which substantially continuously indicates the recent course taken by each of such objects.

Another object of the invention is to provide a display instrument in which the relative position of all detected objects are periodically received at a relatively slow rate and stored for subsequent readout at a relatively fast rate to amplify the speed of otherwise imperceptibly moving objects.

Still another object of the invention is to provide a plan position display apparatus in which repetitive scans of an area of interest are stored for readout at a faster rate than stored thereby discerning the track of moving objects from a stationary background, or a moving background from stationary objects, detected in each scan.

A still further object of the invention is to provide a display instrument especially suitable for use with airborne object detecting devices for distinguishing relatively moving targets from cluttered backgrounds, which is simple in construction and reliable in operation, inexpensive to manufacture, lightweight, compact, and sturdy.

Various other objects and advantages will appear from the following description of one embodiment of the invention, and the most novel features will be particularly pointed out hereinafter in connection with the appended claims.

In the drawings:
FIG. 1 is a diagrammatic view of one embodiment of the invention wherein apparatus is shown for sequentially projecting a series of pictures photographed of a plan position indicator;
FIG. 2 illustrates a representative series of pictures on a segment of photographic film as applied to FIG. 1; and
FIG. 3 illustrates the optical illusion created when the pictures are projected by the apparatus of FIG. 1.

In the illustrated embodiment of the invention, FIG. 1 shows a scanning-type radar unit 20 which detects the range and bearing of wave energy reflecting objects. A rotating antenna 21 driven by a synchronous motor 22 provides a complete 360-degree scan. The range and bearing of the detected objects is transposed into a visual display on a C.R.T.-type plan position indicator 23. Of course, it should be understood that the inventive concept is not limited to a particular mode of object detection or plan position indicator. The motor 22 is also mechanically connected to the shutter of a camera 24 optically trained on the indicator 23 so that the shutter opens for a complete revolution of the antenna 21. A photographic film 26 passing through the camera 24 from a supply reel 27 to a take-up reel 28 is thereby properly exposed and records the instantaneous position of all objects displayed by the indicator 23. The reels 27 and 28 are driven at a constant speed by the motor 22 but the film 26 therebetween is transported intermittently by a Geneva mechanism 29, also connected to the output of the motor 22. Film loops indicated generally by the numerals 31 and 32, adjacent to the reels 27 and 28, respectively, isolate the intermittent film motion imparted by the Geneva mechanism 29 from the constant film speeds at the reels 27 and 28. As illustrated, the photographic film 26 is transported from left to right. Each time the film 26 dwells in the camera 24, as determined by the Geneva mechanism 29, a complete scan of the antenna 21 is exposed thereon. The exposed film 26 is then transported out of the camera 24 into a rapid process film developer 33 where a picture 1, FIG. 2, is formed and chemically fixed thereon. During developing of the picture 1, an adjacent section of the film 26 is being exposed in the camera 24 to a subsequent scan of the antenna 21. When picture 1 advances to a multi-projector 34, the subsequently exposed section enters the developer 33; and still another exposure is made while a picture 2 is formed and fixed adjacent to picture 1. Picture 2 also proceeds into the multi-projector 34 and the exposing and developing steps are repeated during each dwell of the film 26 as determined by the Geneva mechanism 29. Subsequent scan pictures 3 and 4 are also shown in FIG. 2. A plurality of pictures of sequential scans on plan position indicator 23 thus appear in the multi-projector 34 which operates in a manner now to be described.

The multi-projector 34 is comprised of a plurality of optical systems having axes normal to the film 26 and which are equally spaced along the length of the film so that each optical axis centers on a picture 1, 2, 3, 4, etc. of the film 26 during film dwell. The illustrated embodiment shows only two optical systems, the first and last, and each includes a projecting lamp 36, lenses 27 and 28 and a refracting prism 29, the latter for directing the projected images of each optical system onto the same area of a screen 41. Each optical system also includes a normally closed shutter 42 operated by a solenoid 43. The lamps 36 are continuously illuminating but the light is normally blocked by the shutters 42. An electrical selector switch 44 synchronously driven by the motor 22 cyclically energizes the solenoids 43 to momentarily open the shutters 42 in a sequence moving from right to left in the multi-projector 34. Thus, when the picture 1 is in the last and rightmost optical system, the screen 31 will display the projected images in sequence of the pictures 1, 2, 3, 4, etc. at a picture rate determined by the number of optical systems selected for the multi-projector 34 and the synchronous speed at the switch 44. It is desirable that the picture rate be a cine rate in order to create the illusion of smooth motion on the screen 41.

In the illustrated embodiment, a suitable film dwell time, as determined by the Geneva mechanism 29, in the camera 24, the film developer 33, and each optical system is ten seconds. The number of optical systems in the multi-projector 34 was selected as twelve. Thus, when the picture 1 reaches the last optical system on the right, there are twelve pictures 1, 2, 3, 4, etc. in projecting positions; a picture 13 has been exposed and is in the developer 33; and a picture 14 is being photographed in the camera 24. The rotating selector switch 44 cyclically opens and closes the shutters 42 in sequence from right to left so that each picture 1, 2, 3, 4, etc. is projected twenty times onto the screen 41 over the ten-second dwell period. Since there are twelve optical systems, the series of pictures are projected at a cine rate of 24 frames per second.

It is now apparent that since the pictures of the indicator 23 were taken at a relatively slow rate, such as one picture per ten seconds, and they are projected at a much higher rate, such as twenty-four pictures per second, very slow moving objects will appear clearly and perceptibly as moving objects on projection. That is, there is a so-called "time compression" of 240 times in this example. The composite picture which appears on the screen 41 provides a cyclical illusion of a slowly advancing and quickly retreating image among stationary images. The locus or track of the image is visible to the eye and will indicate the recent course taken by moving objects. The length and speed of the image during the advancing portion of a cycle provides a basis for closely estimating the direction and velocity of the moving objects. Referring to FIGS. 2 and 3, for example, a target T is first photographed and appears in picture 1 as shown. Ten seconds later, picture 2 shows that the target T has moved to a new position shown. Pictures 3 and 4 similarly show further displacements of the target T in successive ten-second intervals. When these four target positions are projected at a cine rate in the order of their exposure, they appear in composite form as a single line which slowly advances in a direction shown by the arrow in FIG. 3 and rapidly retreats to its starting position. It will be observed that stationary objects S, since they do not change position between exposures, will also appear stationary in the composite picture of FIG. 3.

Some of the many advantages of the present invention should now be apparent. For instance, it provides a sharp, contrasting display of a scanned area, and the velocities of moving objects are greatly amplified to be clearly and perceptibly distinguishable from stationary objects. There is no superimposing of several pictures to show changes in position of moving objects which tends to diminish brightness and contrast in the display. The present invention also affords better information for closely estimating the direction and velocity of moving objects as required in military tactical missions.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A display apparatus for quickly discerning moving objects from stationary objects detected in space, comprising:
   a scanning unit for detecting the position of objects in space and having a constant speed scanning motor;
   a plan position indicator operatively connected to an output of said scanning unit for displaying a moving picture of the detected objects relative to each other;
   a camera positioned at said indicator for sequentially photographing the moving picture, said camera including a normally closed shutter drivingly connected to the output of said scanning motor and opened thereby at equally spaced time intervals of at least one complete detection scan by said scanning unit;
   a transport mechanism drivingly connected to the output of said scanning motor moving exposed areas of photosensitive strip film past said shutter between the time intervals;
   a rapid film developer adjacent to said camera for receiving and developing the exposed areas to produce fixed pictures;
   a multi-projector adjacent to said film developer for receiving and projecting the fixed pictures, said multi-projector having a series of continuously illuminating optical systems equally spaced along the film path to register with each of a series of the fixed pictures and directed toward a common area of a projection plane;
   a screen positioned in said projection plane for producing illuminated images of the fixed pictures;
   a plurality of normally closed shutters each positioned respectively in each optical system of said multi-projector and each drivingly connected to an electric shutter motor; and
   a selector switch having a plurality of contacts each electrically connected to a respective shutter motor, and armature means drivingly connected to the output of said scanning motor sequentially and cyclically connecting the shutter motors to an electrical supply, the sequence being the same as but at a faster rate than the pictures were photographed.

2. A display apparatus for quickly discerning moving objects from stationary objects detected in space, comprising:
   a camera positioned at a plan position indicator for sequentially photographing the moving picture thereon, said camera including a normally closed shutter drivingly connected to the output of a synchronous motor and opened thereby at equally spaced time intervals;
   a transport mechanism drivingly connected to the output of said synchronous motor moving exposed areas of photosensitive film past said shutter between the time intervals;
   a rapid film developer adjacent to said camera for receiving and developing the exposed areas to produce fixed pictures;
   a multi-projector adjacent to said film developer for receiving and projecting the fixed pictures, said multi-projector having a series of continuously illuminating optical systems equally spaced along the film path to register with each of a series of the fixed pictures and directed toward a common area of a projection plane;
   a screen positioned in said projection plane producing illuminated images of the film pictures;
   a plurality of normally closed shutters each positioned respectively in each optical system of said multi-projector and drivingly connected to an electric shutter motor; and
   a selector switch having a plurality of contacts each electrically connected to a respective shutter motor, and armature means drivingly connected to the output of said synchronous motor sequentially connecting the shutter motors to an electrical supply, the sequence being the same as but at a faster rate than the pictures were photographed.

3. A display apparatus for discerning indicated moving objects from stationary objects detected in space, comprising:
- a camera adapted to be positioned at an indicator for photographing the moving picture thereon, said camera including a normally closed shutter drivingly connected to the output of a motor and opened thereby at equally spaced time intervals;
- a transport mechanism drivingly connected to the output of said motor moving exposed area of photosensitive film past said shutter between the time intervals;
- a film developer adjacent to said camera having means for receiving and developing the exposed areas; and
- a projector having a plurality of optical systems directed toward a common area, a light source in each of said optical systems, means for sequentially and cyclically transmitting light from each of said sources through said optical systems, and means in each of said optical systems receiving one of a series of the developed photographs and cyclically projecting at a relatively fast succession rate onto said common area the first of a sequence of developed photographs and then each succeeding developed photograph as light from each of said light sources is cyclically transmitted.

4. A display apparatus for discerning indicated moving objects from stationary objects, comprising:
- a camera having means for photographing a moving picture display on a photosensitive strip film;
- a film developer having means for receiving and developing the film; and
- a projector having a plurality of optical systems directed toward a common area, a light source in each of said optical systems, means for sequentially and cyclically transmitting light from each of said sources through said optical systems, and means in each of said optical systems receiving one of a series of developed photographs and cyclically projecting at a relatively fast succession rate onto said common area the first of a sequence of developed photographs and then each succeeding developed photograph as light from each of said light sources is cyclically transmitted.

5. A photographic picture correlator, comprising:
- a camera having means for taking a plurality of photographs in sequence at a relatively slow rate;
- a rapid film developer having means for receiving and developing the exposed photographs from said camera;
- a projector having a plurality of optical systems directed toward a common area, a light source in each of said optical systems, means for sequentially and cyclically transmitting light from each of said light sources through said optical systems, and means in each of said optical systems receiving one of a series of the developed photographs and cyclically projecting at a relatively fast succession rate onto said common area the first of a sequence of developed photographs and then each succeeding developed photograph as light from each of said light sources is cyclically transmitted.

6. A display projector, comprising:
- a plurality of optical systems directed toward a common area;
- a light source in each of said optical systems;
- means for sequentially and cyclically transmitting light from each of said sources through said optical systems; and
- means in each of said optical systems receiving one of a series of developed photographs and cyclically projecting at a relatively fast succession rate onto said common area the first of a sequence of developed photographs and then each succeeding developed photograph as light from each of said light sources is cyclically transmitted.

References Cited by the Examiner

UNITED STATES PATENTS

| | | | |
|---|---|---|---|
| 2,582,013 | 1/1952 | De France | 352—133 |
| 2,586,772 | 2/1952 | Ashby et al. | 88—24 X |
| 2,972,741 | 2/1961 | Hammond. | |
| 3,179,002 | 4/1965 | Carpenter | 88—24 |

NORTON ANSHER, *Primary Examiner.*

RICHARD A. WINTERCORN, *Assistant Examiner.*